United States Patent
van Bosse

[15] 3,636,518
[45] Jan. 18, 1972

[54] ARRANGEMENT FOR DETECTING SHORTED DIODES IN SELECTION MATRICES IN CORE MEMORIES

[72] Inventor: John G. van Bosse, Mt. Prospect, Ill.
[73] Assignee: GTE Automatic Electric Laboratories Incorporated, Northlake, Ill.
[22] Filed: Mar. 18, 1970
[21] Appl. No.: 20,715

[52] U.S. Cl............................................340/166, 340/176
[51] Int. Cl...................................H04q 3/00, H04q 5/00
[58] Field of Search..............................340/166, 166 C, 176

[56] References Cited

UNITED STATES PATENTS 3,337,849   8/1967   Lowry.....................................340/166

Primary Examiner—Harold I. Pitts
Attorney—Cyril A. Krenzer, K. Mullerheim, B. E. Franz and Glenn H. Antrim

[57] ABSTRACT

In a selection matrix of a memory circuit, diodes and transistors are connected to an intermediate source of voltage through resistors and sensors. Reverse voltage is thereby applied to the diodes and transistors except when they are selected for operation, and an indication of current flow by the sensors while reverse voltage is applied shows that either a diode or transistor is shorted.

3 Claims, 1 Drawing Figure

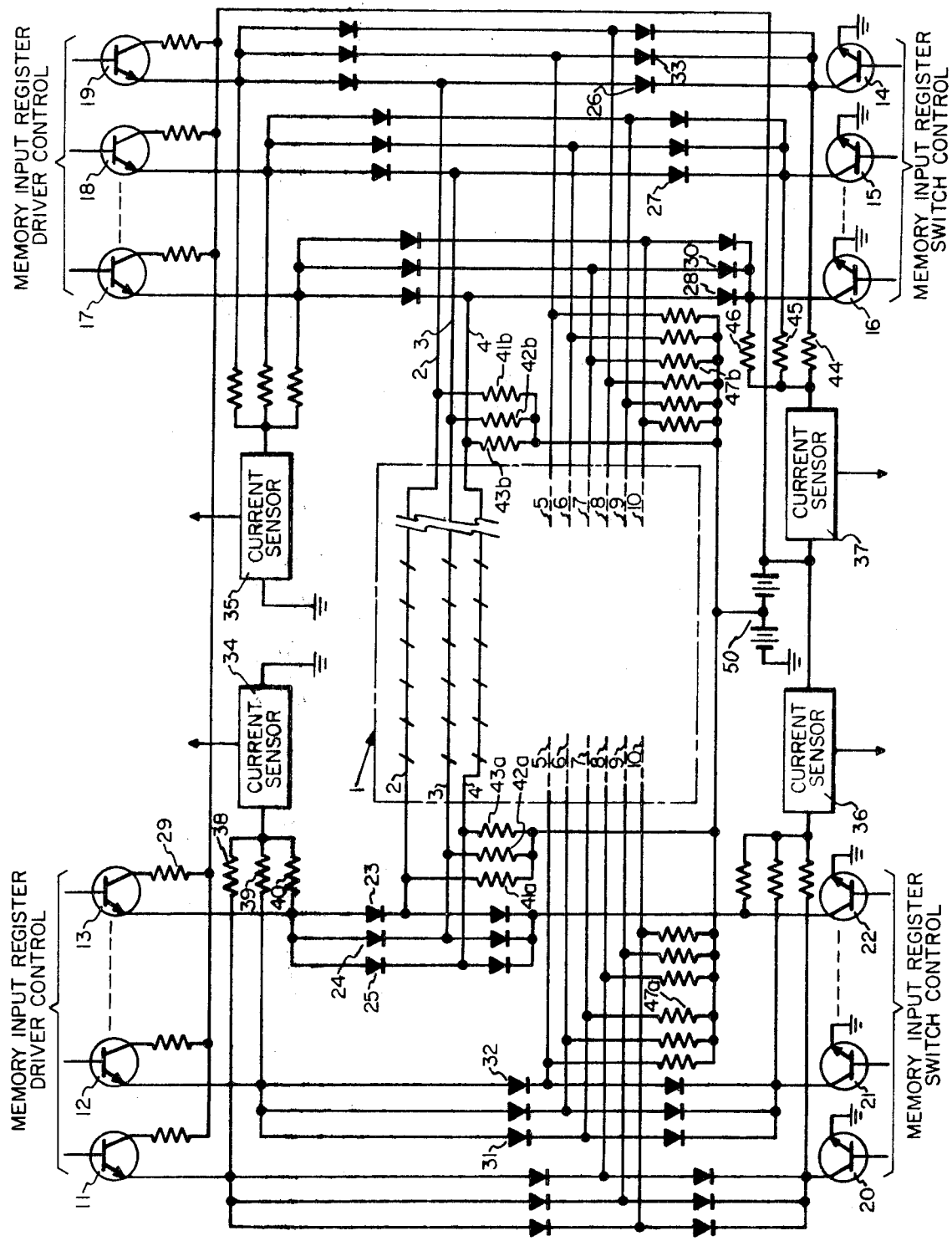

ARRANGEMENT FOR DETECTING SHORTED DIODES IN SELECTION MATRICES IN CORE MEMORIES

BACKGROUND OF THE INVENTION

This invention pertains to routine test circuits in selection matrices of logic circuits. The test circuits are particularly useful for locating short circuits, such as those caused by shorted diodes, that cause "sneak" paths in switching matrices of memory circuits.

Commonly, two groups of transistor drive circuits arranged in a matrix are connected through isolating diodes, that are connected as OR gates functioning as a buffer, to a group of operating conductors, for example, the word conductors, of a memory. In this manner, $2n$ drive circuits can control as many as $n^2$ write circuits.

To prevent repeated faulty operation of memories caused by shorted semiconductor elements, routine testing can be used. Previous test methods include a method in which data is retranslated and compared with original addresses. However, shorted diodes that cause intermittent operation may be difficult to find by the retranslation method. A diode that normally conducts current for only one particular conductor can cause intermittent operation for other conductors in which marginal operating current flows as a result of a shunting circuit completed by a shorted diode. Furthermore, the retranslation method does not give immediate indication of faults that are constant, and it requires complex equipment for retranslation.

Circuit faults that cause errors in a data system are located by continual testing according to U.S. Pat. No. 3,337,849, issued to Terrell N. Lowry on Aug. 22, 1967. Each conductor of a memory matrix is connected through an individual resistor to an "accuracy check" circuit that responds to application of voltage to locate a fault. Normally, operating voltage is applied from a primary translator to a selected conductor, and simultaneously a secondary translator operates to prevent application of the voltage to the input of the accuracy check circuit that is connected to the same conductor through a resistor. Should voltage be applied from a selected conductor through a shorted diode to an unselected conductor, the secondary translator is not effective to prevent application of voltage from the unselected conductor to the accuracy check circuit, and a fault is indicated.

SUMMARY OF THE INVENTION

The testing circuit of this invention is relatively simple in that it does not require translators, and it provides practically continuous testing of diodes and transistors in matrices such as those used in driving circuits of magnetic memories.

Transistors and diodes of matrices are tested continuously during their unoperated or nonconductive intervals by applying to them voltage of reverse polarity through circuits for sensing faults. These circuits include resistors that have values high enough to limit the current in the testing circuits to amounts that do not interfere with operation of the circuits being tested. The circuit that is completed from a conductor through any shorted diode for operating a sensor includes a connection to an intermediate tap on the source of voltage that supplies normal operating current to the conductors, the intermediate tap being connected through an individual resistive means to the conductor that is connected to one terminal of the diode, an isolating resistor connecting a terminal of a current sensor to the other terminal of the diode that is connected to an electrode of its transistor switch, and the other terminal of the current sensor being connected to that terminal of the source of voltage that provides reverse polarity to the diode. The sensor indicates current flow in the reverse direction through a faulty diode when the diode is normally nonconductive.

BRIEF DESCRIPTION OF THE DRAWING

The accompanying single FIGURE is a schematic diagram of a portion of a memory circuit including the test circuit of this invention.

DESCRIPTION OF THE PREFERRED EMBODIMENT

In the accompanying FIGURE, a magnetic memory 1 has a plurality of operating conductors 2–10 to which operating direct current is to be applied selectively by simultaneous operation of a driver and a switch. In this embodiment, one set of drivers and switches provides pulses of current in one direction through the conductors, and other set provides pulses of current in the opposite direction. One group of drivers includes the transistors 11–13, and a group of switches cooperating with these drivers includes the transistors 14–16. One of these drivers and one of these switches are operated simultaneously to cause current to low from left to right through one of the selected conductors 2–10. Another group of drivers includes the transistors 17–19, and the group of switches that cooperate with these drivers includes the transistors 20–22 to provide current flow in the opposite direction through a selected one of the same conductors 2–10.

In more detail, each of the drivers is usually connected to as many conductors 2–10 as there are switches. In order to provide isolation between the conductors that are connected to the same drivers or to the same switches, each driver is connected through different diodes to different conductors. For example, the driver 13 is connected through diodes 23, 24, and 25 to one end of the conductors 2, 3, and 4 respectively, and the other ends of the conductors are connected through the diodes 26, 27, and 28 to the different switch transistors 14, 15, and 16 respectively. The other drivers and switches are connected in a like manner so that the drivers and switches for each direction of current flow may be selected in any combination of two to select a different conductor 2–10.

The operation of the selection matrices to which the test circuits of this invention are to be applied is well known. Briefly, a control register (not shown) applies an operating voltage pulse to the base of only one selected switch transistor, for example, transistor 14, to prepare it for conduction. While a pulse is being applied to the transistor switch 14, the control register applies another pulse to the base of a selected transistor driver, for example, transistor 13, to make it conductive for completing a circuit through a selected one of the conductors 2–10. A complete circuit for establishing a pulse of direct current from left to right through the conductor 2 may be traced from the positive terminal of the source of current 50, the resistor 29, the collector-to-emitter circuit of the transistor driver 13, the isolating diode 23, the conductor 2, the isolating diode 26, the collector-to-emitter circuit of the transistor switch 14, and a common ground that is connected to the negative terminal of the source of current 50.

In many circuits, only one diode that is functioning as an OR gate or buffer between switches and each of the conductors to be driven, need be shorted to cause a short circuit across a selected conductor; but in the present circuit shown in the accompanying drawing, diodes are connected to both the drivers and to the switches and consequently at least two diodes must be shorted to complete an undesired shunting circuit across a selected conductor. An advantage of the present test circuit in the latter type is that a single shorted diode is detected immediately before faulty operation of a memory can occur as a result of the shorting of a second diode.

For example, a typical short circuit exists when the diodes 30 and 31 are shorted. Assuming that the previously traced, selected path is completed, an undesired shunting path extends from the emitter of the transistor 13, through the diode 25, the conductor 4, the diode 28, the shorted diode 30, the conductor 7, the shorted diode 31, the diode 32, the conductor 5, the diode 33, to the collector of the operated transistor switch 14. Typically the shunting circuit may have three times the resistance of the circuit of the selected conductor, and consequently only three-fourths of the normal amount of current flows in the selected conductor. This amount of current may cause the operation of the circuit controlled by this conductor to be marginal, and a type of testing that depends on retranslation may not immediately provide a positive indication of the operating condition of the circuit.

The new test circuit to be added to a typical selection matrix includes current sensors and current limiting and isolating resistors. A wide variation in the number of diodes to be tested with a single sensor is permissible. In the accompanying FIGURE, two current sensors 34 and 35 have been arbitrarily associated with different groups of diodes connected to drivers, and current sensors 36 and 37 have been associated with different groups of diodes connected to switches. Obviously, when the number of diodes in a group tested by one sensor is small, a shorter amount of time for locating a faulty diode within a group is usually required.

Specifically, one terminal of the current sensor 34 is connected through current limiting resistors 38, 39, and 40 to diodes that are connected to the emitters of the transistors 11, 12, and 13. The other terminal of the current sensor 34 is connected to the negative terminal of the source of current 50 to provide reverse polarity to the diodes while their circuits are not selected for operation. The biasing voltage for the diodes 23, 24, and 25 connected to the transistor driver 13 is applied from the negative terminal of the source of current 50 through the current sensor 34, the resistor 40 to the anodes of the diodes. The cathodes of the diodes 23, 24, and 25 are connected through respective pairs of resistors 41a–41b, 42a–42b, and 43a–43b to an intermediate terminal of the source of current 50.

In the switch circuits, one terminal of the sensor 37 is connected directly to the positive terminal of the source of current 50 and the other terminal of the sensor is connected through resistors 44, 45, and 46 to cathodes of diodes associated with the emitters of the transistor switches 14, 15, and 16 respectively. The anodes of these diodes are connected through resistors to the intermediate terminal of the source of current 50; for example, the anode of the diode 28 is connected through the conductor 4 and the parallel resistors 43a and 43b to the intermediate terminal of the source of current 50.

The intervals during which tests are made to discover if reverse current flows through diodes or transistor drivers and switches obviously must occur when the circuits are not normally being made conductive while they are selected for operation. During a testing interval, a shorted diode 31 will cause the sensor 34 to indicate that current greater than the usual small flow of reverse current, flows from the negative terminal of the source of current 50, through the current sensor 34, the resistor 39, the shorted diode 31, the resistors 47a and 47b to the intermediate terminal of the source of current 50. In the type of selection matrices in which a short circuit is caused by only one shorted diode, the replacement of the shorted diode immediately after it is discovered by this method prevents continued error in operation of the memory. Since in the present circuit at least two diodes must become shorted before a harmful short circuit occurs, the detected diode 31 can be replaced immediately to prevent error due to the subsequent short circuiting of a diode such as the diode 30 used in the example above. Similarly, if the diode 30 is the first to be shorted, it will be detected by current flow from the positive terminal of the source of current 50 through the sensor 37, the resistor 46, the shorted diode 30, the parallel resistors 47a and 47b to the intermediate terminal of the source of current 50.

By using sensors that discriminate between two current levels, that are above the normal level of reverse current, current flow through shorted diodes can be distinguished from current flow through shorted transistors. When the diode 23 is shorted, the current flow $I_{23}$ through the sensor 34 is $E/R_{40}+R_{41}$, where E is equal to the voltage between the intermediate terminal of the source of current 50 and its negative terminal, $R_{40}$ is the resistance of the resistor 40, and $R_{41}$ is the combined resistance of the parallel resistors 41a and 41b. The values of the resistors corresponding to the resistors 40, 41a, and 41b are chosen so that the current in any sensing circuit is always substantially below the value of the normal operating current supplied to the conductors 2–10. A different amount of current flows when a transistor is shorted. When the transistor 13 is shorted, the current flow $I_{13}$ through the sensor 34 is $V/R_{29}+R$, where V is substantially the full voltage across the source of current 50, and $R_{29}$ is the resistance of the resistor 29. In a similar manner, a short in one of the transistor switches can be distinguished from a short in one of the diodes connected to the transistor switches. For example, current flow through the transistor 16 when it is shorted is determined by the value of the resistance 46 and the total voltage of the source of supply 50; whereas, the current flow through a shorted diode 28 is determined by the resistor 46, the parallel resistors 43a and 43b, and the voltage between the intermediate terminal of the source of current 50 and its positive terminal.

I claim:

1. In a selection matrix having a source of direct current, a plurality of operating conductors, a plurality of switching elements connected in a matrix between said source and said operating conductors and operable to connect said operating conductors selectively in series with said source of direct current, a plurality of diodes connected as OR gates in a buffer arrangement between said switching elements and said operating conductors,
   a test circuit for routinely checking said matrix for short circuits comprising:
   isolating resistive means connecting said operating conductors individually to said source of direct current for applying to each of said operating conductors a voltage that is intermediate the voltage of said source,
   current sensing means,
   a plurality of resistors, said current sensing means connected through each one of said resistors to one of the junctions connecting each of said switching elements to respective one of said diodes, and said sensing means connected to said source of current at a potential level that normally reverse biases said diodes whereby current flow through said sensing means while said switching elements are nonconductive indicates a short circuit between said operating conductors.

2. In a test circuit for a selection matrix according to claim 1 wherein said operating conductors are windings of magnetic memory systems and said resistive means of said test circuit comprises a pair of resistors for each of said windings, each resistor of said pairs being connected from one end of a respective winding to an intermediate tap of said source of current.

3. In a test circuit for a selection matrix according to claim 1 wherein said resistive means limits the current flow through said current sensing means caused by shorting of any one of said diodes to a first level of current flow substantially different from a second level of current flow through said current sensing means caused by shorting of any one of said switching elements, and said sensing means distinguishing between said first and second levels of current flow.

* * * * *